(12) United States Patent
Ohkubo et al.

(10) Patent No.: US 6,233,425 B1
(45) Date of Patent: May 15, 2001

(54) IMAGE FORMING APPARATUS INCLUDING A DEVICE TO SENSE WHETHER MEDIA IS COPYING-PROHIBITED

(75) Inventors: Hiroshi Ohkubo; Satoru Miyazaki, both of Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/300,485

(22) Filed: Apr. 28, 1999

(51) Int. Cl.[7] .................................................. G03G 21/00
(52) U.S. Cl. ............................................. 399/366; 399/38
(58) Field of Search ................................. 399/366, 8–9, 399/38; 358/501

(56) References Cited

U.S. PATENT DOCUMENTS

| | | | | |
|---|---|---|---|---|
| 5,440,409 | * | 8/1995 | Sugano et al. | 358/501 |
| 5,771,315 | * | 6/1998 | Matsuyama | 382/191 |
| 5,917,619 | * | 6/1999 | Yamagata et al. | 358/501 |

FOREIGN PATENT DOCUMENTS

| | | | |
|---|---|---|---|
| 1-61777 | * | 3/1989 | (JP). |
| 64-61777 | | 3/1989 | (JP). |
| 1-285977 | * | 11/1989 | (JP). |
| 1-285978 | * | 11/1989 | (JP). |
| 6-54185 | * | 2/1994 | (JP). |
| 8-194413 | * | 7/1996 | (JP). |

* cited by examiner

Primary Examiner—Quana M. Grainger
(74) Attorney, Agent, or Firm—Oliff & Berridge, PLC

(57) ABSTRACT

A copier in which reading of an original is carried out simultaneously with formation, on the basis of image data obtained by the reading of the original, of a multicolored transfer image which is to be transferred onto a sheet, and conveying of the sheet is started during the formation of the transfer image, and at a transfer position, the transfer image is transferred onto the sheet. After starting of the reading of the original and before starting of the conveying of the sheet, if it is sensed, on the basis of the image data obtained by the reading of the original, that the original is a copying prohibited original, the sheet is not conveyed and copying processing is stopped.

7 Claims, 6 Drawing Sheets

IMAGE FORMING APPARATUS INCLUDING A DEVICE TO SENSE WHETHER MEDIA IS COPYING-PROHIBITED

BACKGROUND OF THE INVENTION

1. Field of the Invention

The present invention relates to a copier, and in particular to a copier in which reading of an original is carried out simultaneously with formation, on the basis of image data obtained by the reading of the original, of a multicolored transfer image which is to be transferred onto a sheet, and conveying of the sheet is started during the formation of the transfer image, and at a transfer position, the transfer image is transferred onto the sheet.

2. Description of the Related Art

Conventional copiers have been proposed in which, when an original which is to be copied (hereinafter, "original to be copied") is an original for which copying is prohibited (hereinafter, "copying prohibited original"), the copier does not copy the original to be copied (see Japanese Patent Application Laid-Open (JP-A) Nos. 64-61777, 1-285977, 1-285978).

Such copiers judge, from image data obtained by an original reading device, whether the original to be copied is a copying prohibited original. In a case in which the original to be copied is a copying prohibited original, an image outputting means is not activated so that copying is prohibited, and a predetermined message relating to this processing is displayed or the like. In a case in which the original to be copied is not a copying prohibited original, the image outputting means is activated, the image data is processed, and a color copy can be obtained. In this copier, time is required in order to obtain a judgement as to whether the original to be copied is a copying prohibited original. Therefore, the user is forced to wait for a period of time which is even longer than that required from the time a start-copying key is pressed to the time the first copy is obtained, which is a waste of time for users who are not copying copying prohibited originals.

If attempts are made to shorten this period of time from the time the start-copying key is pressed to the time when the first copy is obtained (hereinafter, "first copying time"), a problem arises in that it is not possible to accurately judge whether the original to be copied is a copying prohibited original.

Thus, in order to shorten the first copying time and to accurately judge whether the original to be copied is a copying prohibited original, a method has been contemplated in which the image outputting means is activated while the determination as to whether an original to be copied is a copying prohibited original is being carried out on the basis of the image data obtained from the original reading device. If it is judged that the original to be copied is a copying prohibited original, a portion of the processing being carried out by the image outputting means is changed such that the transfer sheet is completely colored in by a single color and then discharged, or the conveying path of the transfer sheet is changed such that the sheet is guided to a shredder, or the like.

However, printing the sheet in this manner such that it is totally colored in by one color leads to the toner being quickly used up, and further, leads to an increase in the load on the fixing device and other equipment through which the sheet, which is being discharged, passes, which accelerates the deterioration of this equipment. Moreover, if the sheet is to be sent to a shredder or the like, a problem arises in that there is the need to provide the copier with equipment, such as a shredder, which is not originally provided at the copier.

SUMMARY OF THE INVENTION

In view of the aforementioned, an object of the present invention is to provide a copier in which the first copy time can be shortened in a case in which an original to be copied is judged to not be a copying prohibited original, and in which a transfer sheet is not discharged in a case in which an original to be copied is judged to be a copying prohibited original.

In order to achieve the above-described object, the present invention provides a copier in which reading of an original is carried out simultaneously with formation, on the basis of image data obtained by the reading of the original, of a multicolored transfer image which is to be transferred onto a sheet, and conveying of the sheet is started during the formation of the transfer image, and at a transfer position, the transfer image is transferred onto the sheet, the copier comprising: a sensing device which, after starting of the reading of the original and before starting of the conveying of the sheet, senses whether copying processing should be stopped; and a stopping device which, in a case in which the sensing device senses that copying processing should be stopped, stops the copying processing without conveying the sheet.

Namely, the copier of the present invention carries out copying processing as follows. Reading of an original is carried out simultaneously with formation, on the basis of image data obtained by the reading of the original, of a multicolored transfer image which is to be transferred onto a sheet. Conveying of the sheet is started during the formation of the transfer image, and at a transfer position, the transfer image is transferred onto the sheet.

After reading of the original has started and before conveying of the sheet is started, the sensing device senses whether copying processing should be stopped.

Namely, the sensing device senses whether copying processing should be stopped by sensing, on the basis of the image data obtained by the reading of the original, whether the original is a copying prohibited original. The period of time before starting of the conveying of the sheet is at least the period of time before the sheet is pulled out from an accommodating tray which accommodates sheets and the pulled-out sheet reaches a conveying device which conveys sheets.

In a case in which the sensing device senses that copying processing should be stopped, the stopping device stops the copying processing without conveying the sheet.

In this way, if, after reading of the original has started but before conveying of the sheet is started, it is sensed that the copying processing should be stopped, the copying processing is stopped without the sheet being conveyed. Therefore, the time until a copy is discharged can be shortened, and copying is not carried out in cases in which copying should be stopped.

BRIEF DESCRIPTION OF THE DRAWINGS

FIGS. 5A through 5G are timing charts of the copying processing, wherein FIG. 5A illustrates the timing of the reading of an original, FIG. 5B illustrates the timing of light scanning, FIG. 5C illustrates the timing of the transfer of a transfer image onto a transfer belt, FIG. 5D illustrates the timing of a sensing signal when the sensing signal is not input before the sheet conveying time, FIG. 5E illustrates the timing of conveying a sheet when the sensing signal is not input before the sheet conveying time, FIG. 5F illustrates the timing of the sensing signal when the sensing signal is input before the sheet conveying time, and FIG. 5G illustrates the timing of conveying of a sheet when the sensing signal is input before the sheet conveying time.

DESCRIPTION OF THE PREFERRED EMBODIMENTS

Embodiments of the present invention will be described herein after with reference to the drawings.

Figure 1:
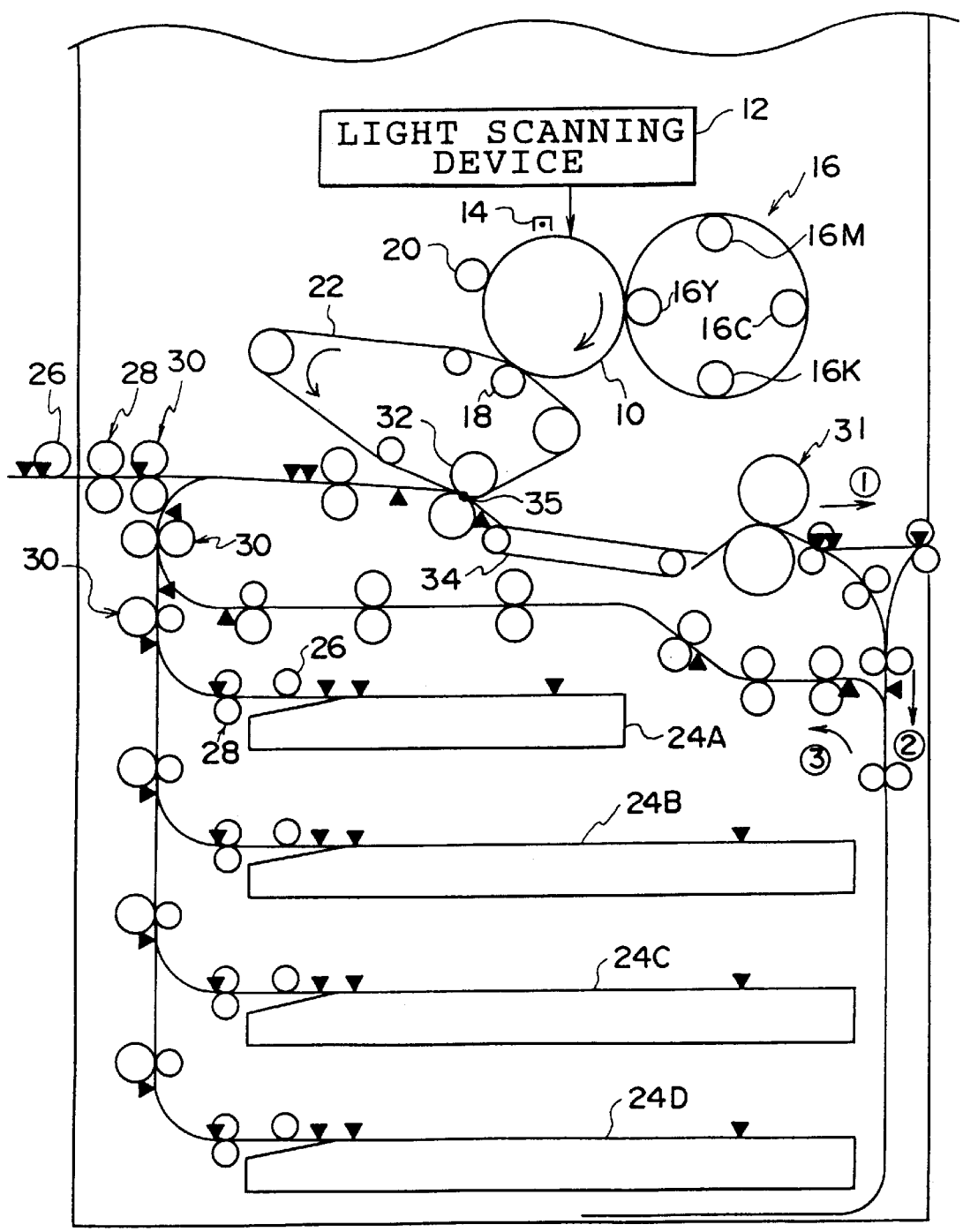
FIG. 1 is a cross-sectional view of a portion of a copier relating to an embodiment of the present invention.

As illustrated in FIG. 1, a copier relating to the present embodiment includes a light scanning device 12 which scans light such that an electrostatic latent image is formed on a photosensitive drum 10. A transfer belt 22 is disposed so as to contact the photosensitive drum 10. A charging device 14 which charges the photosensitive drum 10, a developing device 16 which develops the electrostatic latent image formed on the photosensitive drum 10 by the light scanning device 12, a transfer device 18 which transfers onto the transfer belt 22 the toner image developed on the photosensitive drum 10 by the development by the developing device 16, and a cleaning device 20 which cleans the photosensitive drum 10 are disposed at the periphery of the photosensitive drum 10. The developing device 16 includes a yellow developing device 16Y which develops with yellow (Y) toner, a magenta developing device 16M which develops with magenta (M) toner, a cyan developing device 16C which develops with cyan (C) toner, and a black developing device 16K which develops with black (K) toner. The developing device 16 is rotatable such that the yellow developing device 16Y through the black developing device 16K contact the photosensitive drum 10 in order.

The copier is provided with a plurality of trays 24A through 24D in which sheets of various different sizes are accommodated. At each of the trays 24A through 24D there is provided a pull-out roller 26 which, by rotating by a predetermined amount, pulls out an accommodated sheet to a conveying roller pair 28 disposed in a vicinity of each of the trays 24A through 24D. Guides (not shown) are disposed in the copier from the conveying roller pair 28 to the transfer position of the transfer belt 22 so as to form a conveying path. Conveying roller pairs 30 which convey the sheets are provided at plural locations along the conveying path.

A transfer device 32, which transfers the toner image on the transfer belt 22 onto a sheet, is disposed at the transfer position of the transfer belt 22.

A loading portion (not shown), into which a manual paper feed tray is loaded, is formed at a side surface of the copier. The pull-out roller 26, conveying roller pair 28 and conveying roller pair 30 are provided to correspond to the manual paper feed tray as well, such that the sheets accommodated in the manual paper feed tray can be conveyed to the aforementioned transfer position.

The conveying device of the present invention is formed by the conveying roller pairs 28, 30 as well as other members.

A conveying belt 34 is provided at the sheet conveying direction downstream side of the transfer device 32. The conveying belt 34 conveys a sheet, onto which the toner image on the transfer belt 22 was transferred, to the fixing device 31 which fixes the transferred toner image.

The copier has conveying paths ①, ②, ③. Conveying path ① discharges to the exterior of the copier a sheet on which a toner image has been fixed by the fixing device 31. Conveying path ② conveys downwardly and within the copier a sheet on which a toner image has been fixed by the fixing device 31. Conveying path ③ conveys a sheet, which was conveyed by conveying path ②, to the transfer position again. In cases in which a toner image is transferred onto only one side of a sheet, the sheet is conveyed along conveying path ①. In cases in which toner images are formed on both sides of a sheet, the sheet is conveyed along conveying paths ②, ③ in that order. Namely, when a sheet is conveyed along conveying path ②, a toner image is transferred onto one side (the front surface) of the sheet, whereas when a sheet is conveyed along conveying path ③, a toner image is transferred onto the other side (the reverse surface) of the sheet.

Figure 2:
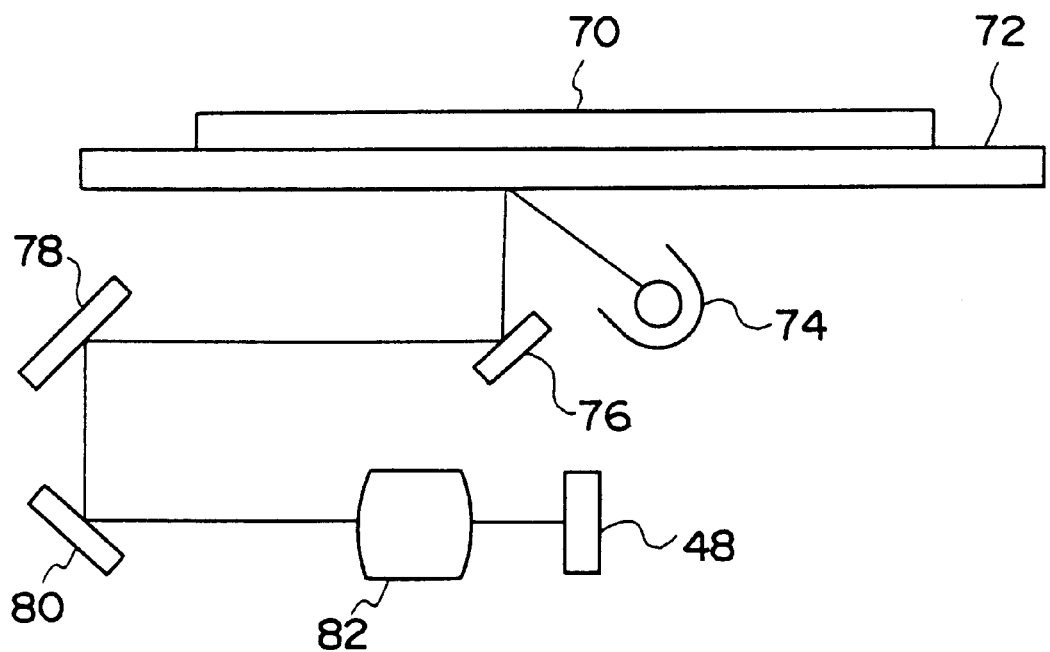
FIG. 2 is a diagram illustrating an original reading unit.

As illustrated in FIG. 2, the copier is provided with an original reading unit which reads an original 70 placed on a loading stand 72. The original reading unit has a lamp 74 which illuminates the original 70 and a mirror 76 which reflects the light reflected from the original 70. The lamp 74 and the mirror 76 move integrally beneath the original 70. The original reading unit is provided with mirrors 78, 80, which reflect the light reflected by the mirror 76, and a lens 82, which focuses onto an image reading device 48 the light which is reflected by the mirrors 76, 78, 80. The image reading device 48 may be a CCD or the like.

Figure 3:
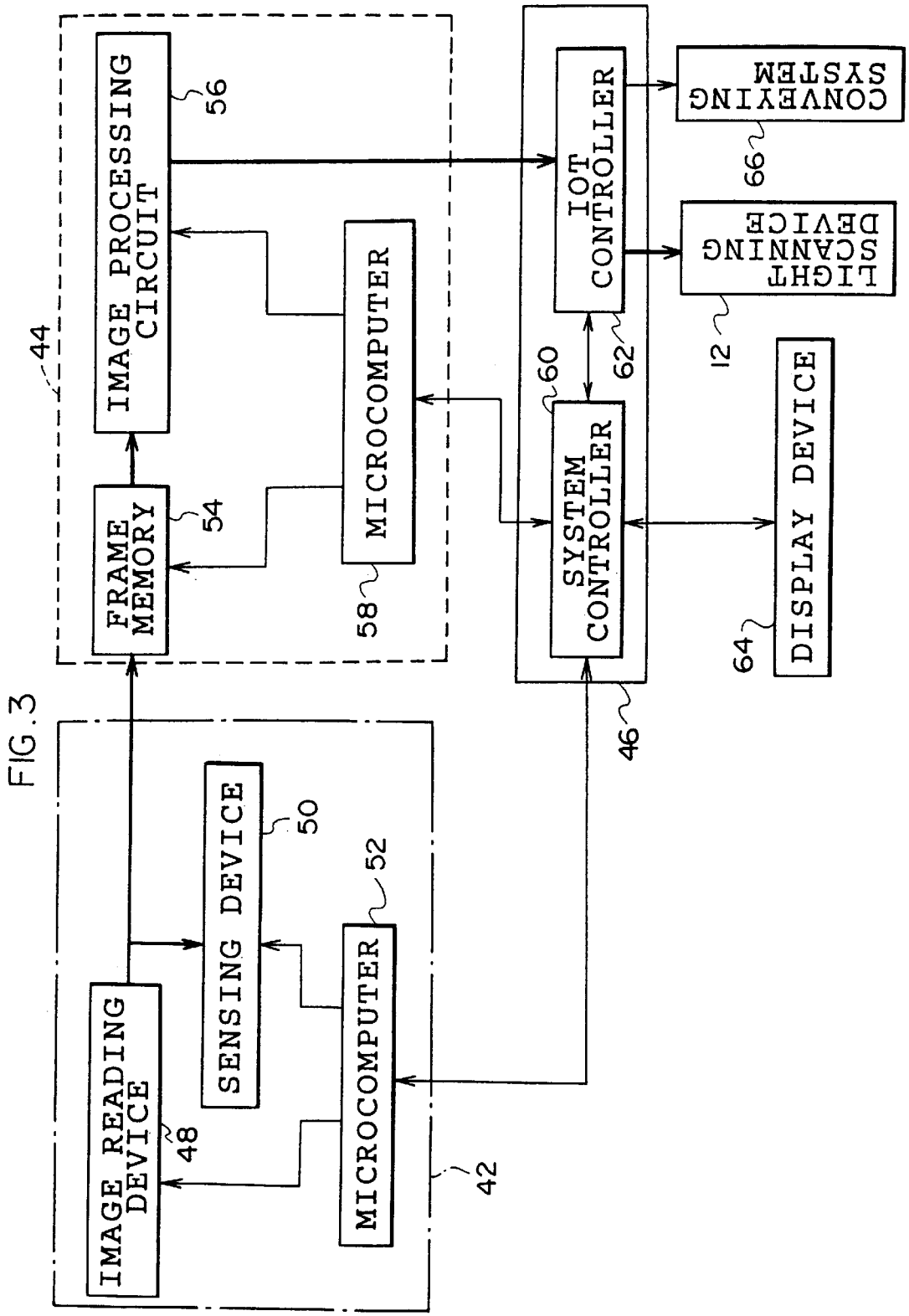
FIG. 3 is a block diagram of a control system of the copier relating to the embodiment.

Next, the control system of the copier will be described. As illustrated in FIG. 3, the control system includes an image input terminal 42 which inputs image data of the original, an image processing system 44 which carries out image processing such as shading correction, γ correction and the like on the basis of the inputted image data, and an image output terminal 46 which controls the entire copier.

The image input terminal 42 includes the aforementioned image reading device 48, a sensing device 50 which, on the basis of image data obtained from the image reading device 48, senses whether the original is a copying prohibited original (e.g., paper money, stocks, bonds), and a microcomputer 52 which controls the image reading device 48 and the sensing device 50. The sensing device 50 stores predetermined image data of various types of copying prohibited originals, and compares the image data obtained from the original reading device 48 with image data of copying prohibited originals. In a case in which at least a portion of the image data obtained from the image reading device 48 corresponds to image data of a copying prohibited original, the sensing device 50 senses that the original is a copying prohibited original and outputs a sensing signal.

The image processing system 44 includes a frame memory 54 which stores image data of one frame which image data is inputted from the image input terminal 42, an image processing circuit 56 which carries out the aforementioned image processing on the basis of the image data stored in the frame memory 54, and a microcomputer 58 which controls the frame memory 54 and the image processing circuit 56.

The image output terminal 46 is provided with a system controller 60 which controls the microcomputers 52, 58 and sequence controls the entire copier, and a IOT controller 62 which controls the conveying of the sheets and the light scanning. A display device 64 is connected to the system controller 60. The display device 64 displays predetermined information. When a user touches a portion of the display device 64, the display device 64 senses the portion which has been touched, and outputs information corresponding to the portion which was touched to the system controller 60. A conveying system 66 which drives the light scanning device 12, the conveying rollers 28, 30, and the like is connected to the IOT controller 62. Further, various devices necessary to image formation (the forming of the electrostatic latent image, the transfer of the toner image, and the like) are also connected to the IOT controller 62.

Operation of the present embodiment will now be described.

When a user wishes to copy an original, he/she places the original on the loading stand 72, and touches a predetermined position on the display screen of the display device 64 which predetermined position instructs copying processing. When this predetermined position of the display screen of the display device 64 which instructs copying processing is touched, the display device 64 instructs the system controller 60 to start copying processing. The copying processing routine of FIG. 4 is thereby started.

Figure 4:
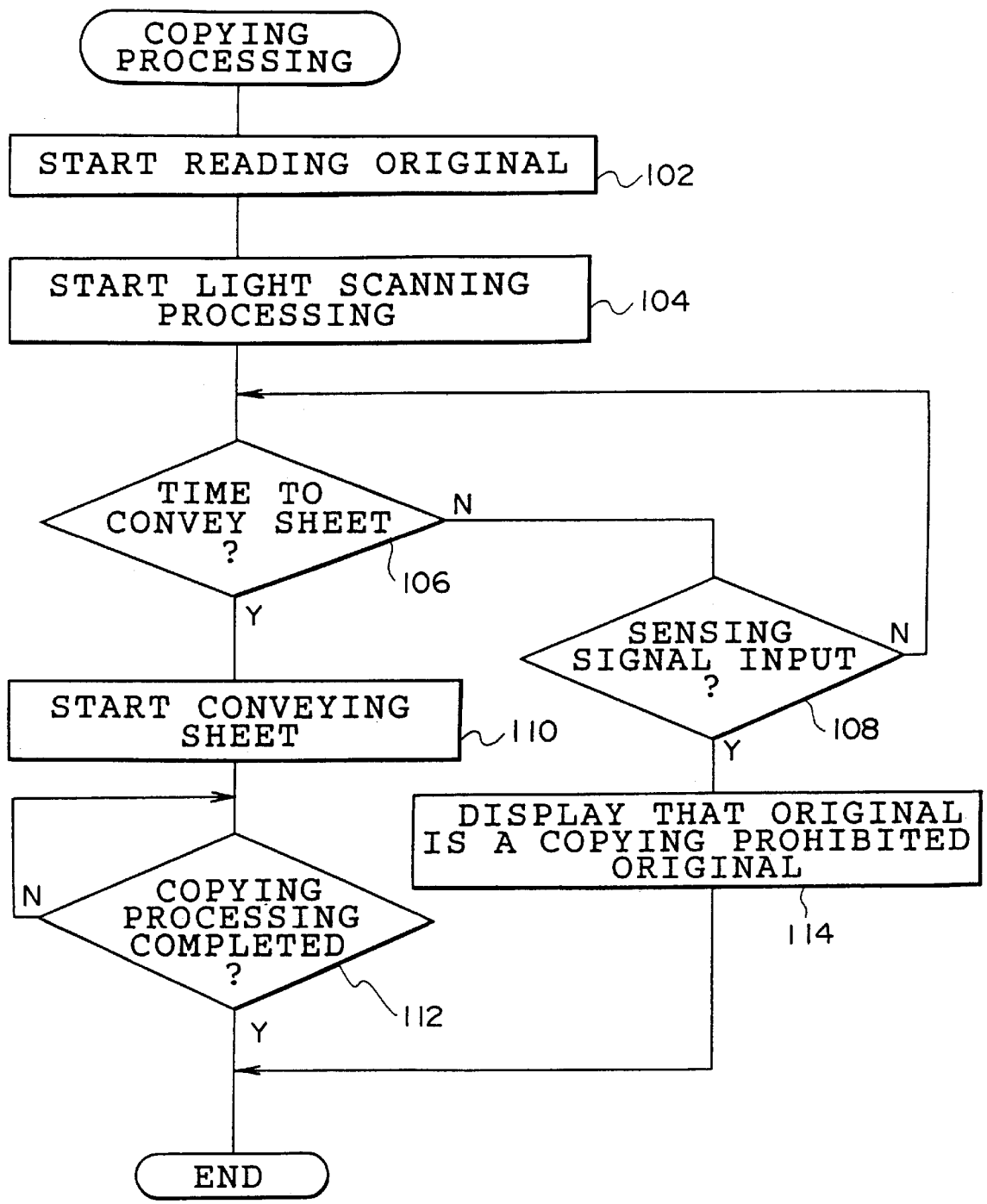
FIG. 4 is a flowchart illustrating a copying processing routine.
Figure 5:
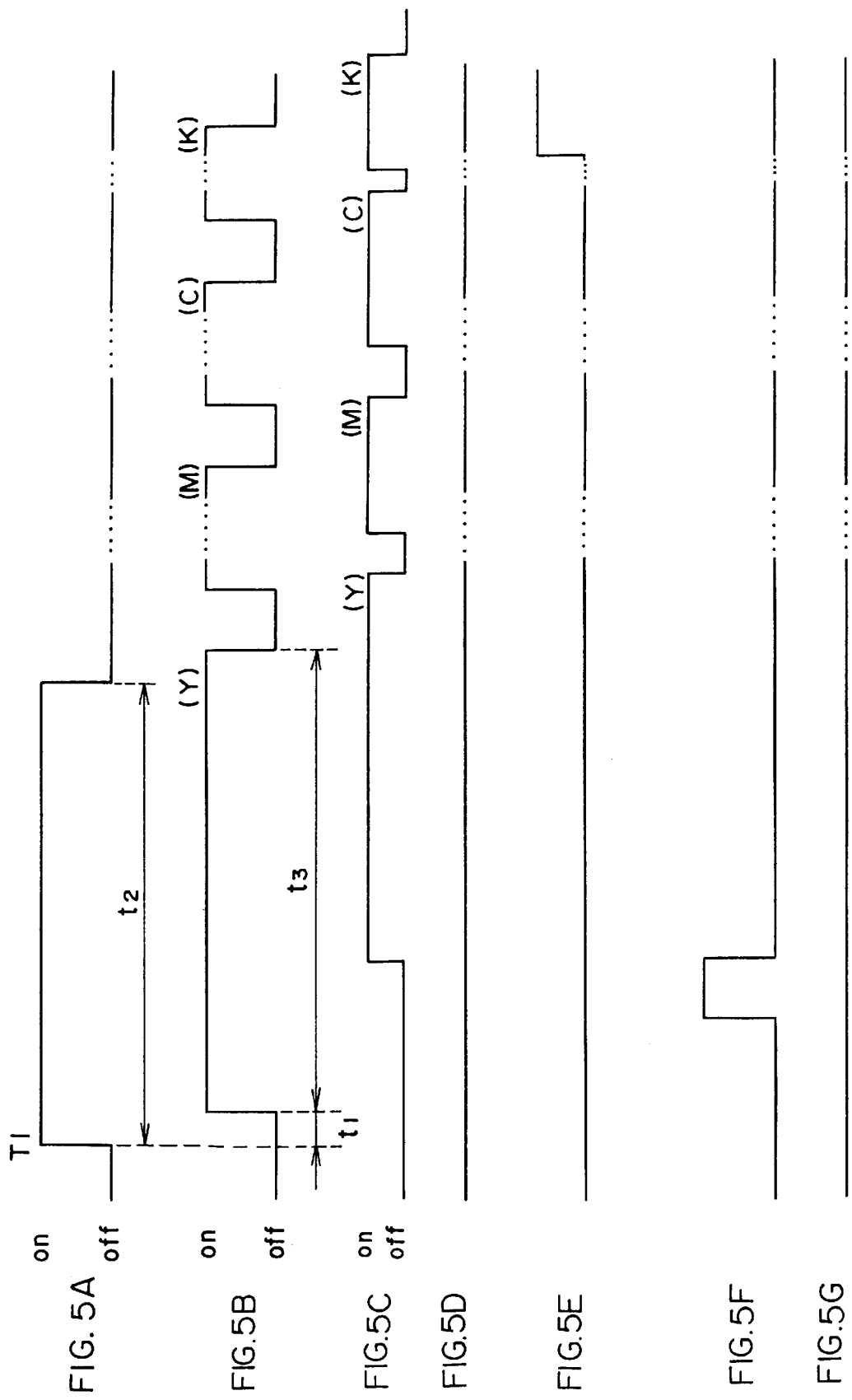

In step 102 of FIG. 4, the original reading unit is operated, and reading of the original is started (see time T1 in FIG. 5A). In the next step 104, the light scanning device 12 is driven, and light scanning processing is started. A delay time t1 for driving the light scanning device from the reading of the original includes the delay of the processing time at the image processing device. After this delay time t1 has passed from the time T1, driving of the light scanning device 12 is started, and the light scanning device 12 is operated for a time t3 which corresponds to the length of the original (the direction of movement of the lamp 74). Further, the period of time when the original reading timing is on corresponds to the time t2 for reading the length of the original (the direction of movement of the lamp 74). Here, on the basis of the read image data, the light scanning device 12 first forms an electrostatic latent image for yellow on the photosensitive drum 10. The electrostatic latent image for yellow is developed by the yellow developing device 16Y such that a yellow toner image is formed. Then, the yellow toner image is transferred onto the transfer belt 22 (see FIG. 5C). Thereafter, the photosensitive drum 10 is cleaned at the cleaning device 20, and receives the next light scan. Next, on the basis of the image data read at the original reading unit, an electrostatic latent image for magenta is formed on the photosensitive drum 10. The electrostatic latent image for magenta is developed by the magenta developing device 16M which has moved to a position near the photosensitive drum 10, such that a magenta toner image is formed. Then, at a timing for matching the position of the leading end of the yellow toner image, the magenta toner image is transferred onto the transfer belt 22. At this time, if the positions of the leading ends do not match, the respective colors will be offset, resulting in an unappealing color image. Thereafter, as shown in FIG. 5B, in the same way as the yellow toner image and the magenta toner image, the cyan toner image and the black toner image are superposed in order on the transfer belt 22 at timings such that the leading ends match. In this way, a color (multicolor) transfer image is formed on the transfer belt.

As described above, while the processes of forming the electrostatic latent images of the respective colors and developing the electrostatic latent images are being carried out, in step 106, it is determined whether it is time to convey the sheet. If it is not time to convey the sheet, in step 108, a determination is made as to whether the copying prohibited original sensing signal, which is outputted from the sensing device 50 via the microcomputer 52 in a case in which it is sensed that the original is a copying prohibited original, has been inputted. If the sensing signal has not been inputted, the routine returns to step 106 where the determination is made as to whether it is time to convey the sheet.

In the present embodiment, as illustrated in FIG. 5E, the sheet conveying driving is turned on while the processes of forming the electrostatic latent images of the respective colors and developing the electrostatic latent images are being carried out or while the process of transfer from the photosensitive drum 10 to the transfer belt 22 is being carried out, for example, during the formation of the electrostatic latent image for black. Namely, if the sheet is conveyed after completion of the forming on the transfer belt 22 of the color (multicolor) transfer image to be transferred onto a sheet, the time until a sheet accommodated in any of the trays 24A to 24D reaches the transfer position is wasteful, and the first copying time until the first copy is discharged is long. Thus, in the present embodiment, the on time of the sheet conveying driving is adjusted such that the sheet arrives at a transfer point 35 at the time when the formation of the transfer image on the transfer belt 22 is completed and the transfer image can be transferred (the time when the position of the leading end of the transfer image has entered into the transfer point 35). Namely, when the sheet must be conveyed from the tray 24D and thus the distance the sheet must be conveyed to the transfer point 35 is long, the sheet conveying driving time is early. When the sheet is conveyed from the tray 24A or the manual feed tray and thus the distance the sheet must be conveyed to the transfer point 35 is short, there is no problem even if the sheet conveying driving time is late.

As shown in FIG. 5E, if the copying prohibited original sensing signal has not been inputted by the sheet conveying time (i.e., if the answer to the determination in step 106 is affirmative), in step 110, conveying of the sheet is started. Namely, when it is time to convey the sheet, via the IOT controller 62, the pull-out roller 26 is driven, a sheet is pulled out, the conveying roller pairs 28, 30 are driven, and the sheet is conveyed. The sheet thereby arrives at the transfer point 35. Thus, the transfer image on the transfer belt 22 is transferred onto the sheet by the transfer device 32, and is fixed to the sheet by the fixing device 31. Then, the sheet to which the transfer image has been fixed is discharged to the exterior of the copier.

On the other hand, as illustrated in FIG. 5F, in a case in which the copying prohibited original sensing signal is input by the sheet conveying time (i.e., if the answer to the determination in step 108 is affirmative), in step 114, it is displayed on the display screen of the display device 64 that the original is a copying prohibited original, and the present routine is finished. Namely, as illustrated in FIG. 5G, the sheet conveying timing is not on, and conveying of the sheet is not started. Thereafter, the surface of the photosensitive drum 10 is cleaned by the cleaning device 20, the surface of the transfer belt 22 is cleaned by an unillustrated cleaning device, and the image data of the copying prohibited original stored in the frame memory 54 is erased. In this way, the copying prohibited original is not copied.

The sensing of a copying prohibited original may be started together with the start of operation of the original reading device, and by extending the sensing processing time to even after the original reading operation has been completed, the sensing operation can be continued.

However, usually, even if the sensing operation is extended to after completion of the reading of the original, the sensing operation is completed within one second after the original reading operation has been completed (within the range illustrated by the broken line in FIG. 5F). At this time, it is possible to emit the signal only during the time the sensing signal is sensed. Alternatively, if the sensing signal is generated once, it may be maintained throughout the time the original reading device is being operated.

In the present embodiment, the sheet is not conveyed in a case in which it is sensed, after the start of reading of the original and before the sheet conveying time, that the original is a copying prohibited original. Namely, in the present embodiment, for each color, electrostatic latent images are formed and the formed electrostatic latent images are developed, and the toner images are superposed one on top of the other on the transfer belt so as to form the transfer image. Thus, up to the time when formation of the transfer image on the transfer belt 22 is completed, i.e., up to the time that the transfer image is in a state in which it can be transferred onto a sheet, there is sufficient time to sense whether the original is a copying prohibited original. Thus, if, during the time until the transfer image is able to be transferred onto a sheet, it is sensed that the original is a copying prohibited original, the sheet is not conveyed. In this way, it is possible to shorten the time until a copy is discharged and to not copy copying prohibited originals.

This shortening of the time until the copy is discharged and providing sufficient time to sense whether the original is a copying prohibited original is not limited to the above-described forming of a transfer image by transferring toner images of plural colors onto an intermediate transfer medium (the transfer belt).

Figure 6:
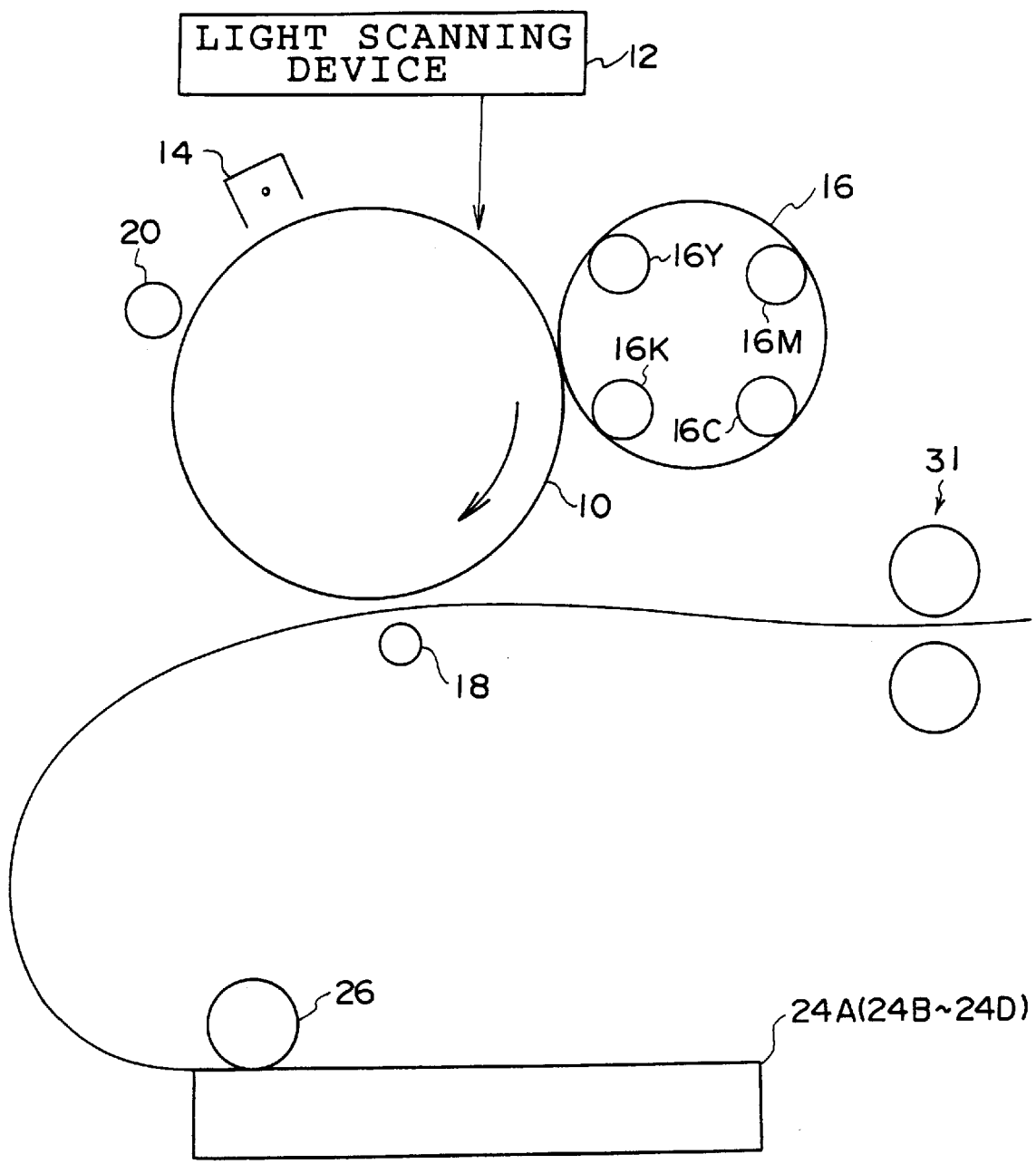
FIG. 6 is a cross-sectional view of a portion of the copier relating to a modified example.

Namely, as illustrated in FIG. 6, the present invention is also applicable to a copier structured as follows (i.e., a copier without a transfer belt). For each color, an electrostatic latent image is formed on the photosensitive drum 10 and the formed electrostatic latent images are developed such that a transfer image is formed on the photosensitive drum 10. The sheet conveying time is during the formation of the electrostatic latent images of the respective colors and the developing of the formed electrostatic latent images. A sheet is pulled out from a tray and conveyed to the transfer device 18, and the transfer image is transferred onto the sheet.

Here, the sheet conveying time is the time at which the conveying of the sheet is started, and as in the present embodiment, the time when a sheet accommodated in a tray begins to be pulled out may be used as the sheet conveying time. However, the present invention is not limited to the same, and strictly speaking, any time up to a time before the sheet reaches the conveying roller pair 28 may be used as the sheet conveying time. Namely, if the conveying of the sheet is stopped after the sheet has reached the conveying roller pair, thereafter, if the tray is pulled out, it will be pulled out with the sheet nipped by the conveying roller pair, and the sheet might tear and cause a paper jam. Thus, strictly speaking, the sheet conveying time must be some time up to the time when the sheet reaches the conveying roller pair.

In the above-described examples, the display device displays that the original is a copying prohibited original. However, the present invention is not limited to the same, and instead of such a display, or in addition to such a display, a warning may be sounded.

In the above examples, a sheet accommodated in a tray is conveyed. However, the present invention is not limited to the same, and is also applicable to a case in which a sheet accommodated in a manual paper feed tray is conveyed.

Further, in the above examples, a transfer image of four colors is formed. However, the present invention is not limited to the same, and is also applicable in a similar manner to cases in which transfer images of two or more colors are formed.

What is claimed is:

1. An image forming apparatus comprising:

an image reading means for reading of an original is carried out simultaneously with formation, on the basis of image data obtained by the reading of the original, of a multicolored transfer image which is to be transferred onto a sheet, and conveying of the sheet is started during the formation of the transfer image, and at a transfer position, the transfer image is transferred onto the sheet;

a sensing device which, after starting of the reading of the original and before starting of the conveying of the sheet, senses, on the basis of the image data obtained by the reading of the original, whether the original is a copying prohibited original; and a stopping device which, in a case in which said sensing device senses that the original is a copying prohibited original; stops copying processing without conveying the sheet.

2. An image forming apparatus according to claim 1, wherein the period of time before starting of the conveying of the sheet is at least the period of time before the sheet is pulled out from an accommodating tray which accommodates sheets and the pulled-out sheet reaches a conveying device which conveys sheets.

3. An image forming apparatus according to claim 2, wherein the period of time before starting the conveying of the sheet is the period of time before the sheet is pulled out from the accommodating tray and the pulled-out sheet reaches a pair of conveying rollers disposed in the vicinity of a sheet output of the accommodating tray.

4. An image forming apparatus according to claim 1, wherein said sensing device outputs a detection signal for prohibiting copying when at least a part of image data, which image data is obtained by reading an original by said image reading device and is compared with image data of the copying prohibited original stored in a memory, coincides with the image data of the copying prohibited original.

5. An image forming apparatus according to claim 3, wherein the detection signal for prohibiting copying is outputted to a sheet conveying device via an image output controller to prohibit the conveying of the sheet.

6. An image forming apparatus according to claim 4, wherein the detection signal for prohibiting copying is outputted to a display device via the image output controller to display notification that copying is prohibited.

7. An image forming apparatus according to claim 1, further comprising an intermediate transfer medium, wherein the sensing device senses whether the original is a copying prohibited original after starting of the reading of the original and before the transfer image is able to be transferred from the intermediate transfer medium to a sheet.

* * * * *